(12) United States Patent
Kim et al.

(10) Patent No.: US 6,308,874 B1
(45) Date of Patent: Oct. 30, 2001

(54) ROOF RACK ASSEMBLY

(75) Inventors: Roger Kim, Southfield; Nicholas Waskul, Fenton; Minyong Lee, Inkster; Steve Aidenbaum, West Bloomfield, all of MI (US)

(73) Assignee: Ford Global Technologies, Inc.

( * ) Notice: Subject to any disclaimer, the term of this patent is extended or adjusted under 35 U.S.C. 154(b) by 0 days.

(21) Appl. No.: 09/451,876

(22) Filed: Dec. 1, 1999

(51) Int. Cl.[7] .................................................. B60R 9/00
(52) U.S. Cl. ...................... 224/310; 224/309; 224/320; 224/321; 414/462
(58) Field of Search ........................... 224/310, 309, 224/320, 321, 324, 326, 327, 280, 281, 282; 414/462

(56) References Cited

U.S. PATENT DOCUMENTS

| | | |
|---|---|---|
| 3,158,301 | 11/1964 | Hedgepath . |
| 3,963,136 * | 6/1976 | Spanke .............................. 224/310 X |
| 4,403,716 | 9/1983 | Carlson et al. . |
| 4,887,750 * | 12/1989 | Dainty ................................ 224/310 X |
| 4,953,757 | 9/1990 | Stevens et al. . |
| 5,058,791 * | 10/1991 | Henriquez et al. ................... 224/310 |
| 5,535,929 * | 7/1996 | Neill ..................................... 224/310 |
| 5,560,525 | 10/1996 | Grohmann et al. . |
| 5,632,591 * | 5/1997 | Henriquez ............................ 414/462 |
| 5,649,655 | 7/1997 | Kerner . |
| 5,690,259 | 11/1997 | Montani . |
| 5,904,463 * | 5/1999 | Christensen ......................... 414/462 |

FOREIGN PATENT DOCUMENTS

| | | | |
|---|---|---|---|
| 67723 | 12/1982 | (EP) . | |
| 0152643-A * | 9/1983 | (JP) ..................................... 224/310 |
| 406107081-A * | 4/1994 | (JP) ..................................... 224/310 |

* cited by examiner

Primary Examiner—Stephen K. Cronin
Assistant Examiner—Maerena W. Brevard
(74) Attorney, Agent, or Firm—Ford Global Tech., Inc.

(57) ABSTRACT

A roof rack assembly 10 for use in combination with a vehicle 12 of the type having a roof 14 and a rear or back portion or end 16 including a rear door or hatchback 18. Assembly 10 includes a pair of elongated support rails or members 20, 22, a movable rack or storage member 24 which is movably coupled to said rail members 20, 22, and several fasteners or fastening members 26, 28, 30 and 32. Rack member 24 is movable between a "roof-mounted" position in which rack member 24 is substantially parallel to roof 14 and a "back end-mounted" position in which said rack member is substantially parallel to back end 16.

6 Claims, 4 Drawing Sheets

ROOF RACK ASSEMBLY

FIELD OF THE INVENTION

The present invention generally relates to a roof rack assembly and more particularly, to a roof rack assembly which is operatively deployed upon a vehicle and which is selectively movable to allow a user or operator of the assembly to, relatively easily and quickly, load and unload items to/from the assembly.

BACKGROUND OF THE INVENTION

Roof racks are generally deployed upon or secured to the roof of a vehicle, such as and without limitation a typical "sports utility vehicle", and are effective to securely store and retain items, objects, and other cargo which are desired to be transported by the vehicle.

Roof racks typically include several elongated members or rails which may be selectively and removably connected to the vehicle and which cooperatively form a frame or support structure. Particularly, some or all of these members are normally adapted to be fixedly attached or coupled to the roof of the vehicle, and when properly deployed upon the roof and properly connected, are adapted to cooperatively provide a supporting structure upon which cargo, such as skis, bikes, luggage, and other items can be "tied down" or otherwise secured to the roof rack by one or more conventional fastening members.

One of the major drawbacks associated with many of these prior roof rack assemblies is that they are relatively difficult and inconvenient to access, thereby making the process of loading and/or unloading cargo and other items to/from the rack assemblies undesirably time-consuming and difficult. Particularly, in order to secure and/or remove items to/from these prior rack assemblies, a user typically is required to reside in or to achieve an elevated position (e.g., by use of a ladder), since these prior rack assemblies are fixedly coupled to the roof of the vehicle. Moreover, since the secured cargo and/or other items are generally located above a user's head and/or "eye level", it is relatively difficult for a user to ensure that the retained cargo and/or other items are safely and properly secured upon the roof rack.

There is therefore a need for a new and improved roof rack assembly which overcomes many, if not all, of the previously delineated drawbacks of such prior roof rack assemblies.

SUMMARY OF THE INVENTION

It is therefore a primary object of the invention to provide a roof rack assembly which overcomes at least some, if not all, of the previously delineated disadvantages of prior roof rack assemblies.

It is second object of the invention to provide a roof rack assembly which includes a portion which is selectively removable from the roof, thereby allowing a user to access the assembly from "ground level" and without the use of an elevation mechanism and/or assembly.

It is a third object of the invention to provide a roof rack assembly which is further characterized by an attribute of allowing a user to relatively easily secure and/or remove cargo to/from the roof rack.

It is a fourth object of the invention to provide a roof rack assembly which does not substantially obstruct and/or hinder the ingress and/or egress to/from the vehicle passenger compartment.

According to one aspect of the present invention an assembly for use in combination with a vehicle of the type having a roof is provided. The assembly includes first and second elongated rails which are respectively and fixedly secured to the roof. The first elongated rail is substantially parallel to the second elongated rail and each rail includes a longitudinally extending slot. The assembly includes a rack member having first and second portions which each orthogonally project from the rack member and which are each movably disposed within a unique one of the slots, thereby allowing the rack member to be movable from a first position in which the rack member substantially overlays the roof, to a second position in which the rack member is remote from the roof.

According to a second aspect of the present invention a method for removably securing an item to a vehicle having a roof and a rear end portion is provided. The method includes the steps of providing a pair of elongated rails, each of the rails having a elongated slot; fixedly coupling the pair of elongated rails upon the roof in a substantially parallel relationship; slidably disposing a rack within the pair of elongated rails, effective to allow the rack to be movable from a first position in which the rack substantially overlays the roof and a second position in which the rack substantially overlays the end portion.

Further objects, features, and advantages of the present invention will become apparent from a consideration of the following description and the subjoined claims, when taken in conjunction with the accompanying drawings.

DETAILED DESCRIPTION OF THE INVENTION

Figure 1:
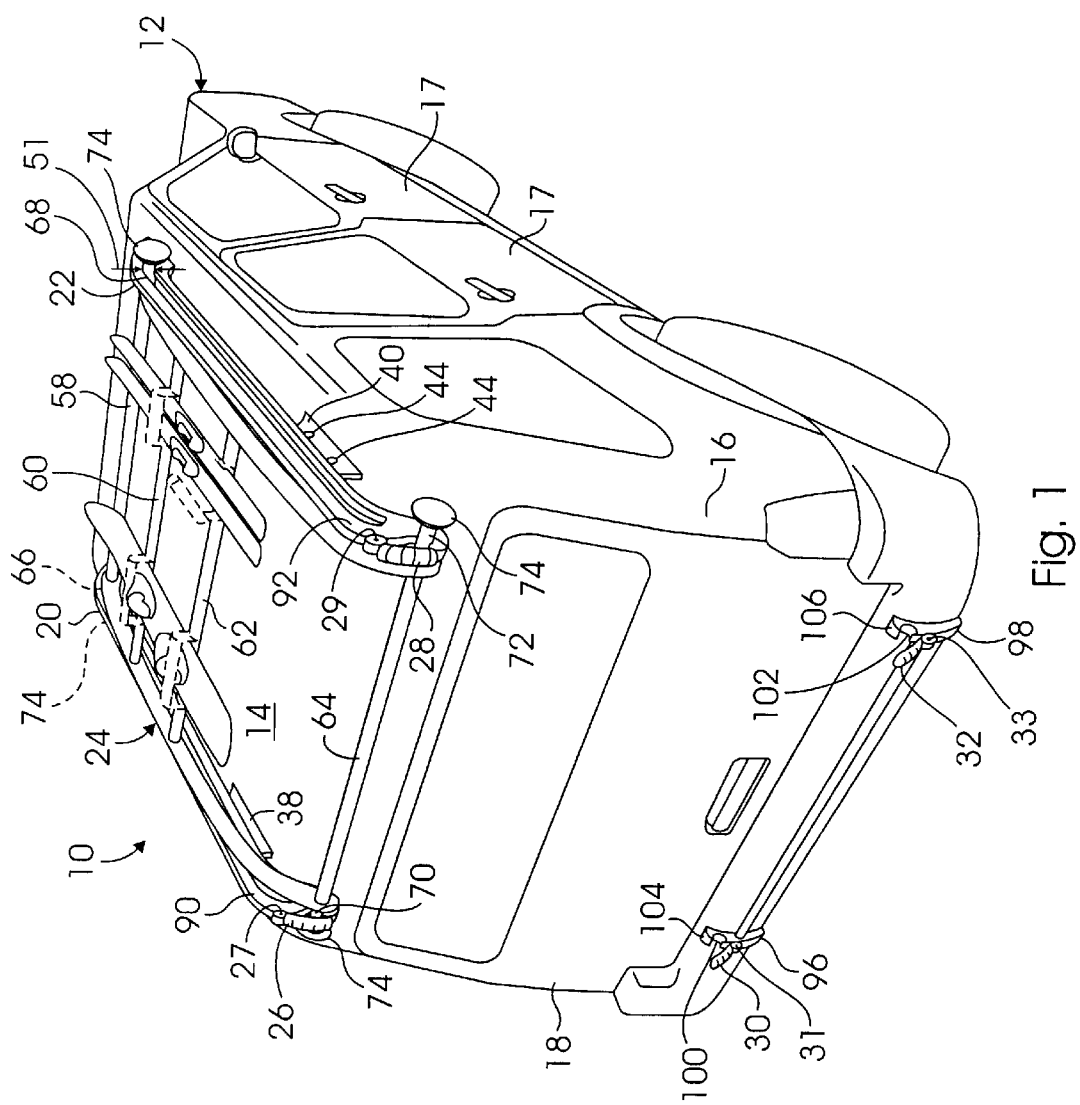
FIG. 1 is a perspective view of a roof rack assembly which is made in accordance with the teachings of the preferred embodiment of this invention and which is selectively deployed upon a vehicle.
Figure 2:
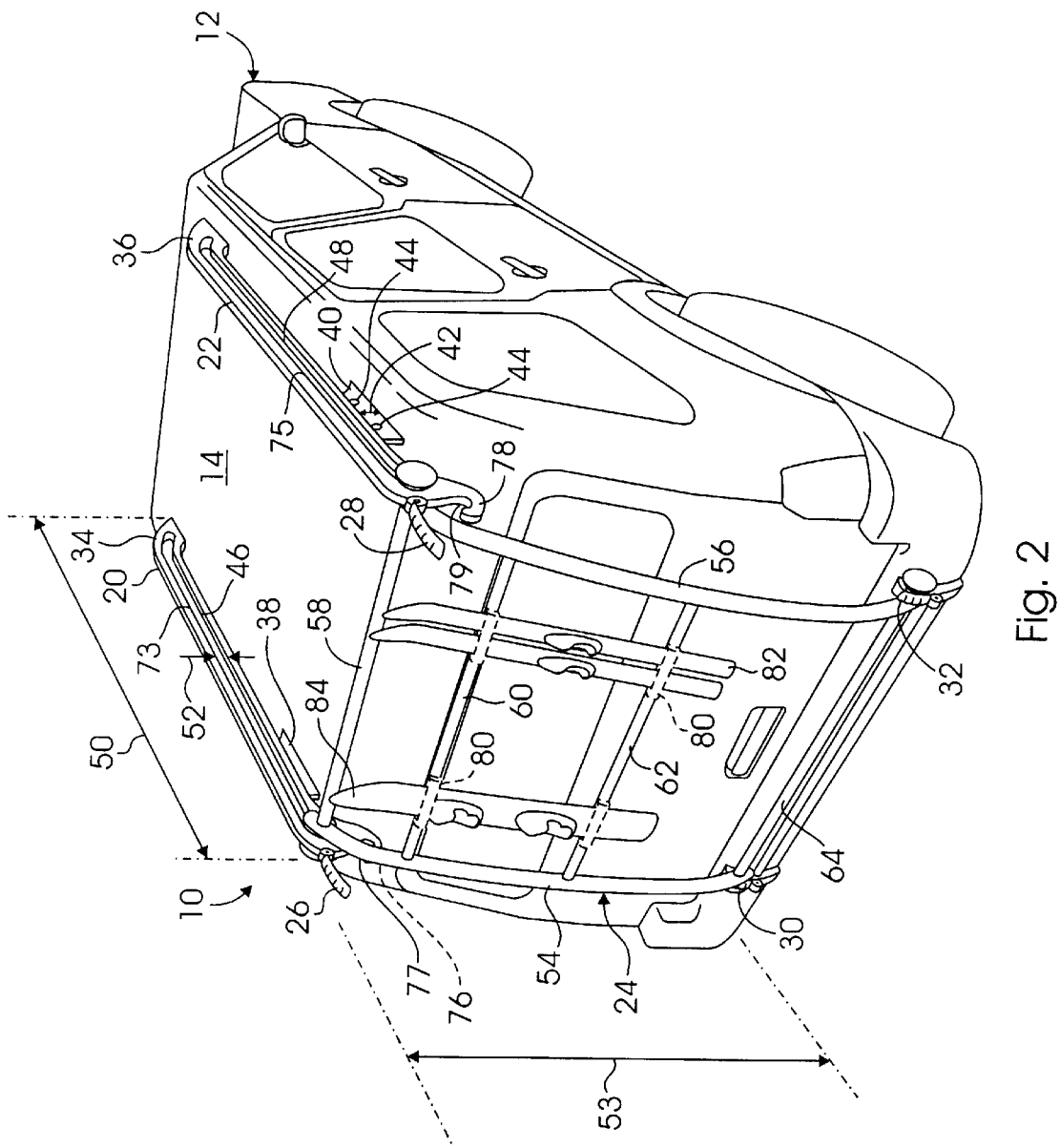
FIG. 2 is a perspective view of the roof rack assembly which is shown in FIG. 1 and which illustrates an alternative "back end-mounted" configuration and/or assembly.
Figure 3:
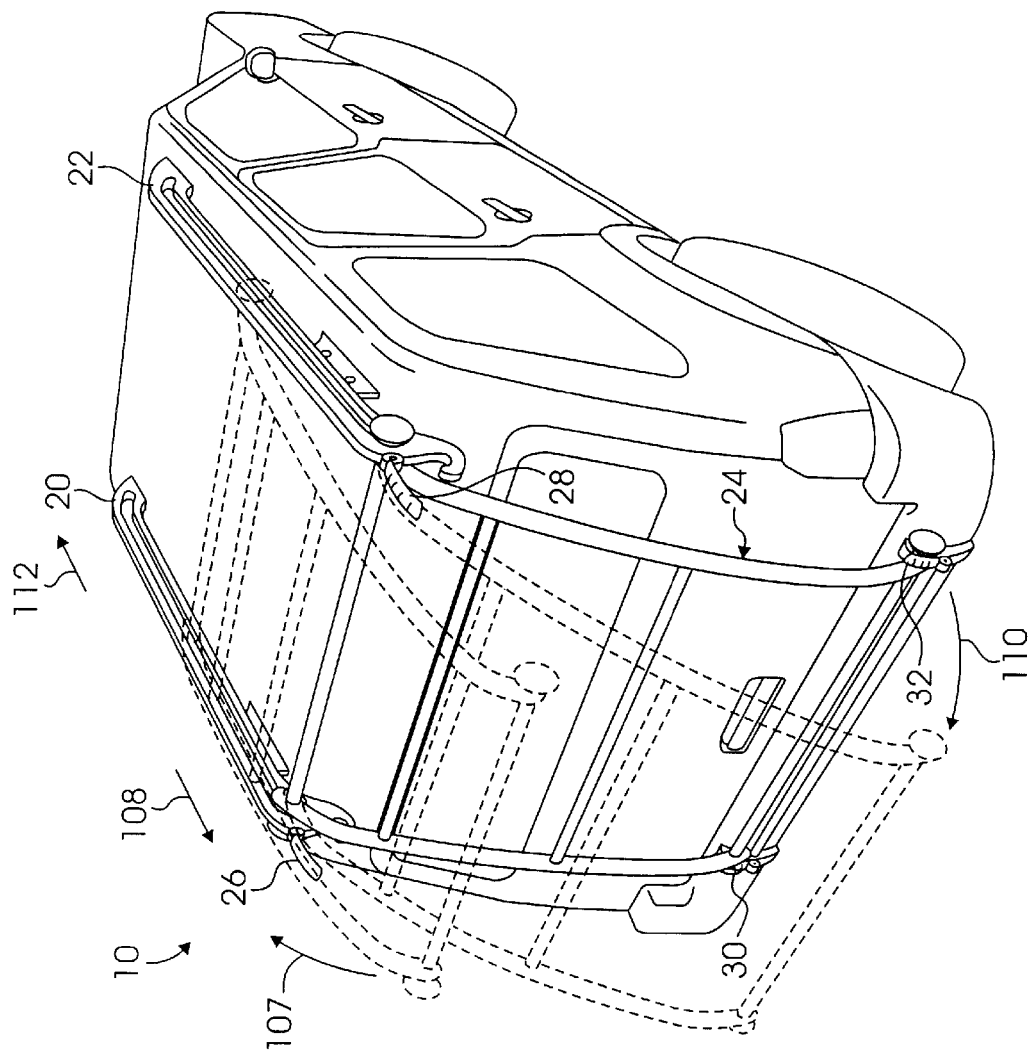
FIG. 3 is a side view of the roof rack assembly which is shown in FIG. 1 and which illustrates the movement of the assembly from a first "roof-mounted" position, shown in FIG. 1, to a second "back end-mounted" position, shown in FIG. 2.

Referring now to FIGS. 1–3, there is shown a roof rack assembly 10 which is made in accordance with the teachings of the preferred embodiment of the invention. As shown, assembly 10 is operatively deployed upon a vehicle 12 of the type having a roof 14 and a rear or back portion or end 16 including a rear door or hatchback 18. While the following discussion describes the use of assembly 10 in connection with vehicle 12, which may for example and without limitation comprise a "sports-utility vehicle", it should be appreciated that assembly 10 may be operatively deployed upon and/or used in combination with virtually any other type of vehicle (e.g., a van, mini-van, truck, or car) or apparatus having an elevated surface or portion, such as roof 14, on or above which cargo and/or other items may be desirably and removably stored or retained. As shown, assembly 10 includes a pair of elongated support rails or members 20, 22, a movable rack or storage member 24, which is movably coupled to and/or movably disposed within rail members 20, 22, and a plurality of fasteners or fastening members 26, 28, 30 and 32.

Members 20, 22 are, in one non-limiting embodiment, substantially identical elongated "rails", each having a generally rectangular body and substantially identical curved, and integrally formed and respective end portions 34, 36. As shown, members 20, 22 are respectively coupled or attached to roof 14. That is, the bent or "curved" anterior end portions 34, 36 are each attached to roof 14 in a conventional manner. Generally trapezoidal shaped support members 38, 40, which are conventionally and fixedly coupled to members 20, 22, are also conventionally attached to roof 14 and cooperate with end portions 34, 36 to support rail members 20, 22 at some predetermined and desired height or distance 42 above roof 14, thereby substantially preventing rack 24 or any items placed on rack 24 from scratching or damaging roof 14. More particularly, portions 34, 36 and members 38, 40 are respectively attached to roof 14 in a conventional manner such as by bolts, clamps, screws, adhesives and/or any other suitable fastening devices or methodologies. In the preferred embodiment of the invention, support members 38, 40 include substantially identical apertures which are adapted to selectively receive rope, cord, cables or other members which can be used to "tie down" or secure cargo or items to roof 14, rail members 20, 22, and/or rack 24.

Rail members 20, 22 each respectively include slots or channels 46, 48 which are respectively, substantially and longitudinally coextensive with rail members 20, 22. Channels 46, 48 each has a substantially identical length 50 and a substantially identical "width" 52, which is substantially uniform over length 50. Members 20, 22 each respectively further include integrally formed, respective, and substantially hook-shaped portions 76, 78, which respectively form reception slots 77, 79. Members 20, 22 and 38, 40 are manufactured and/or formed from a strong and durable material such as aluminum, steel or any other suitable material.

Rack member 24 further includes a pair of substantially identical and generally cylindrical or tubular members 54, 56, which are interconnected by a plurality of "cross bars" or laterally disposed or extending members 58, 60, 62, and 64 which are fixedly coupled to members 54, 56 in a conventional manner such as by welding, bonding, or by use of any other suitable and conventional fastening mechanisms and/or methodologies. Each member 54, 56 has a length 53 which is substantially identical to length 50 of each of the channels 46, 48. In the preferred embodiment of the invention, members 54, 56 are slightly bowed or "curved". In the preferred embodiment of the invention, members 60, 62 each include a plurality of conventional fastening devices or mechanisms 80 which operatively and selectively secure items or cargo, such and without limitation skies 82 and snowboard 84, to rack 24. In other alternate embodiments, rack 24 includes different and/or additional fastening and/or storage mechanisms, which may include without limitation clamps, storage containers, straps, clasps, bike racks, and/or any other type of conventional fastening and storage devices or mechanisms.

Members 54, 56 each respectively include a pair of members or portions 66, 68 and 70, 72, which respectively and orthogonally project from members 54, 56, as illustrated best in FIG. 1. In one non-limiting embodiment of the invention, portions 66, 68 extend from and/or are integrally formed with member 58. Portions 70, 72 extend from and/or are integrally formed with member 64. In the preferred embodiment of the invention, portions 66–72 are generally cylindrical in shape and each include and/or form a substantially identical widened, enlarged, or "flared" end portion or end piece 74. Portions 66, 68 respectively traverse and/or operatively extend through channels 46, 48, and have a diameter 51 which is slightly smaller than diameter 52, thereby allowing portions 66, 68 to operatively and slidably engage the surfaces 73, 75 which respectively form channels 46, 48. In one non-limiting embodiment, portions 66, 68 each include a circumferentially disposed, conventional bearing or bushing which rotatably engages the surfaces 73, 75 and operatively allows portions 66, 68 to slide within and rotate with respect to channels 46, 48. Portions 74 reside and/or are disposed on the "outside" of rails 20, 22 and are effective to respectively and operatively retain portions 66 and 68 substantially within channels 46, 48 and to respectively and substantially prevent portions 66, 68 from becoming dislodged from channels 46, 48.

In the preferred embodiment of the invention, fasteners 26–32 are substantially identical conventional "latch-type" fasteners or fastening mechanisms. In other alternate embodiments, fasteners 26–32 may comprise a variety of other known attachment or fastening devices or apparatuses. In the preferred embodiment of the invention, fasteners 26, 28 are respectively, conventionally and pivotally mounted upon rails 20, 22, by way of conventional pins or rods 27, 29, and in relative close proximity to back ends 90, 92 of rails 20, 22. Fasteners 26, 28 are pivotally movable between a "latched" or "locked" position, which is illustrated in FIG. 1 and in which the fasteners 26, 28 are respectively, conventionally, mechanically and/or frictionally attached or coupled to hook portions 76, 78, thereby selectively and securely retaining portions 70, 72 within slots 77, 79; and an "unlatched" or "unlocked" position, which is illustrated in FIG. 2 and in which the fasteners 26, 28 are removed from hook portions 76, 78, thereby allowing portions 70, 72 to be selectively and respectively removed from or inserted into slots 77, 79. In one non-limiting embodiment, fasteners 30, 32 are respectively, conventionally, and pivotally mounted, by way of conventional pins or rods 31, 33, upon a pair of generally tubular support members 96, 98, which are conventionally and fixedly coupled to the back end 16 of vehicle 12. Members 96, 98 respectively include hook-shaped portions 104, 106 which respectively form reception slots 100, 102 that selectively and respectively receive portions 74, 76. Members 30, 32 are substantially identical in structure and function to members 26, 28 and are pivotally movable from a "latched" or "locked" position, which is illustrated in FIG. 2 and in which the fasteners 30, 32 are respectively, conventionally, mechanically and/or frictionally attached or coupled to hook portions 104, 106, thereby selectively and securely retaining portions 74, 76 within slots 104, 106; and an "unlatched" or "unlocked" position, which is illustrated in FIG. 1 and in which the fasteners 30, 32 are removed from hook portions 104, 106, thereby allowing portions 74, 76 to be selectively and respectively removed from or inserted into slots 100, 102.

In operation, rack member 24 of assembly 10 is selectively and operatively movable between a "roof-mounted" position, as illustrated in FIG. 1, and a "back end-mounted" position, as illustrated in FIG. 2. Particularly, as shown in FIG. 1, rack member 24 may be operatively secured and/or disposed in relative close proximity to roof 14 and in a substantially parallel position with respect to roof 14 (e.g., rack member 24 is disposed "above" or substantially "overlays" roof 14). Rack member 24 may be removably secured or "locked" in this "roof-mounted" position by way of fasteners 26, 28, which, as previously described, are effective to removably secure portions 70, 72 within slots 77, 79.

Rack member 24 may also be operatively secured and/or disposed in relative close proximity to back end 16 and in a substantially parallel relationship with respect to back end 16 (e.g., rack member 24 is disposed "adjacent" to or substantially "overlays" back end 16, as illustrated in FIG. 2). Rack member 24 may be removably secured or "locked" in this "back end-mounted" position by way of fasteners 30, 32, which as previously described are effective to removably secure portions 70, 72 within slots 100, 102.

While in this "back end-mounted" secured position, a user of assembly 10 is allowed to relatively easily load and unload items onto rack member 24 from "ground level" and/or without the use of a ladder or other elevation device. Moreover, a user is able to ensure that the attached cargo is properly secured to rack 24 before mounting rack 24 above roof 14. Furthermore, if additional storage space is needed, assembly 10 allows a user to "lock" or secure rack member 24 in this "back end-mounted" position by way of fasteners 30, 32, thereby allowing a user to place and/or secure additional items to the roof of the vehicle by way of one or more straps, cables, netting, cords, containers, or other suitable fastening and/or storage devices. In other non-limiting embodiments, assembly 10 includes one or more "laterally" disposed roof-residing rail members which are coupled to and interconnect rail members 20, 22 and provide additional devices and/or mechanisms for securing cargo and other items above roof 14.

As best shown in FIG. 3, rack member 24 is slidably movable between the "roof-mounted" position, which is illustrated in FIG. 1, and the "back end-mounted" position, which is illustrated in FIG. 2. Particularly, if a user desires to load and/or unload cargo to/from rack 24, when it resides in the "roof-mounted" position, a user first unfastens members 26, 28 and lifts member 64 in the direction illustrated by arrow 107, thereby respectively removing portions 70, 72 from slots 77, 79. A user then pulls and/or slides member 24 in the direction illustrated by arrow 108, thereby causing portions 66, 68 to slide within channels 46, 48 and moving member 24 in the direction of arrow 108, as shown in "phantom" in FIG. 3. Once portions 66, 68 reach the back ends 90, 92 of rails 20, 22 and/or channels 46, 48, a user lowers rack 24 and engages portions 70, 72 within slots 100, 102. A user may then load and/or unload cargo to/from rack 24 and may selectively reposition or mount rack 24 above roof 14. In order to reposition rack 24 above roof 14, a user lifts and/or pivots rack 24 in the direction of arrow 110, and pushes or slides rack 24 in the direction of arrow 112, thereby causing portions 66, 68 to respectively slide within channels 46, 48. Once portions 66, 68 reach the front ends 34, 36 of rails 20, 22 or of channels 46, 48, a user engages portions 70, 72 within slots 77, 79 and re-fastens or "locks" fasteners 26, 28, thereby operatively securing portions 70, 72 within slots 77, 79. In this manner, roof rack assembly 10 may be used without obstructing the ingress/egress to/from the vehicle passenger compartment through hatchback 18. Moreover, it should be appreciated that assembly 10 never obstructs the ingress/egress to/from the passenger compartment through any of the other vehicle doors 17.

Figure 5:
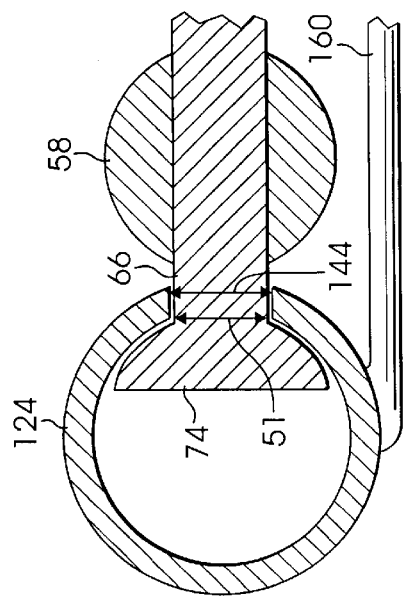
FIG. 5 is a partial cross sectional view of the roof rack assembly which is shown in FIG. 4 and which is taken along view line 5—5.
Figure 4:
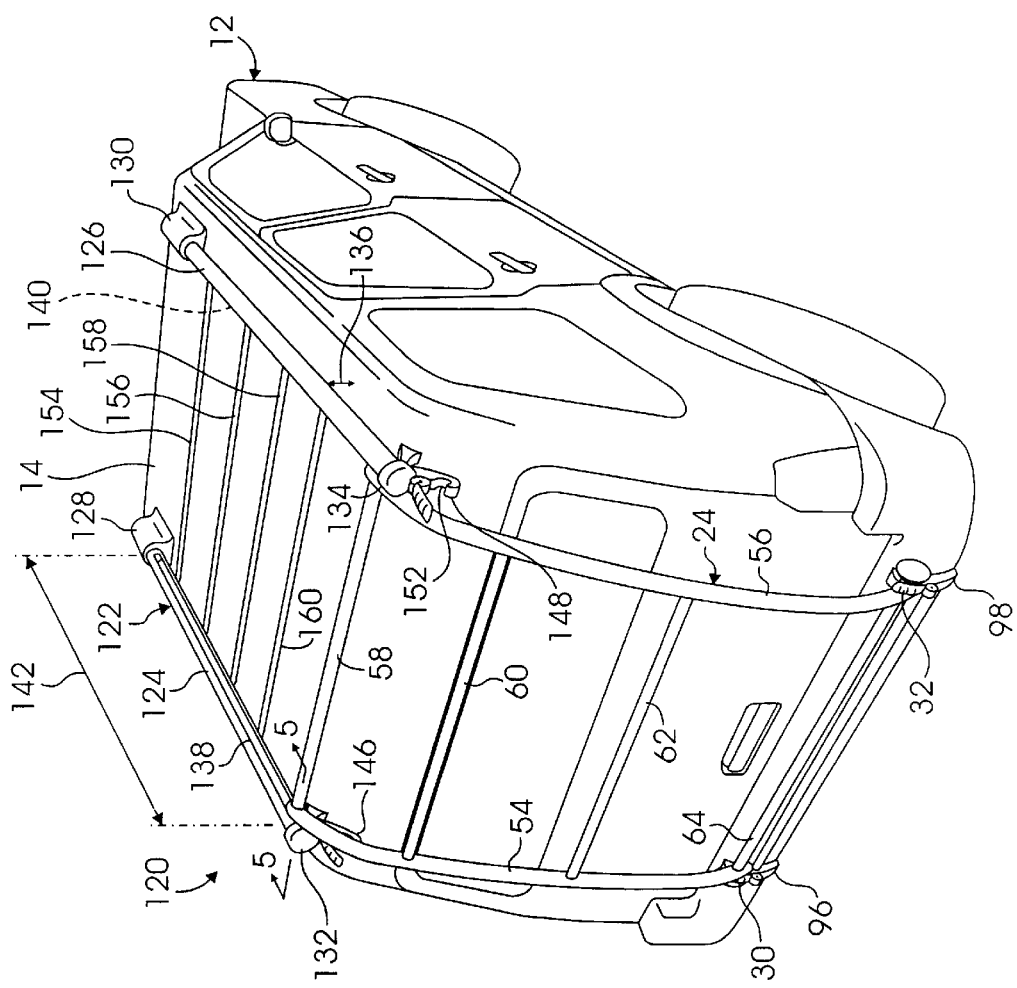
FIG. 4 is a perspective view of a roof rack assembly which is made in accordance with a second embodiment of the present invention and which is operatively deployed upon a vehicle.

Referring now to FIGS. 4 and 5, a roof rack assembly 120 made in accordance with the teachings of a second embodiment of the invention is provided. Assembly 120 is substantially similar to assembly 10, except that rails 20, 22 have been replaced by rail assembly 122. With the exception of rail assembly 122, assembly 120 includes substantially identical components as assembly 10. Components having a substantially identical structure and function are defined by the same reference numerals as the components of assembly 10 delineated in FIGS. 1–3.

In this alternate embodiment, rail assembly 122 includes a pair of elongated and generally cylindrical or "tubular" rail members 124, 126. Rail members 124, 126 are adapted to be fixedly and/or removably secured upon the roof 14 of vehicle 12 in a manner substantially similar to the manner previously described for rails 20, 22. Particularly, rails 124, 126 are respectively coupled or attached to roof 14 by bent or "curved" anterior end pieces or members 128, 130, which are respectively, conventionally and telescopically coupled to rails 124, 126, and by back end pieces or members 132, 134 which are respectively, conventionally and telescopically coupled to rails 124, 126, and which cooperate with end portions 128, 130 to support rails 124, 126 at some predetermined and desired height or distance 136 above roof 14. Portions 128, 130 and members 132, 134 are attached to roof 14 in a manner substantially identical to that previously and respectively described for portions 34, 36 and members 38, 40.

Rail members 124, 126 each respectively include a pair of substantially identical slots or channels 138, 140 which are substantially and longitudinally coextensive with rail members 124, 126. Channels 138, 140 have a substantially identical length 142 and a "width" 144 which is substantially uniform over length 142, and which is slightly larger than width 51. Members 124, 126 each respectively further include hook-shaped portions 146, 148 which are respectively and substantially similar in structure and function to portions 76, 78, and which respectively form reception slots 150, 152. Rails 124, 126 and members 128–134 are manufactured and/or formed from a strong and durable material such as aluminum, steel or any other suitable material.

Rail assembly 122 further includes a plurality of substantially identical laterally disposed or extending bars or members 154–160, which are conventionally and fixedly coupled to and interconnect rail members 124, 126. In one non-limiting embodiment, members 154–160 each include one or more conventional fastening or storing mechanisms, such as and without limitation mechanisms 80. In other alternate embodiments, rail assembly 122 includes one or more conventional storage compartments or containers, which are removably and conventionally coupled to rails 124, 126, and are disposed between rails 124, 126.

Rack 24 is movable within assembly 120 in a substantially similar manner to that described with respect to assembly 10. As best shown in FIG. 5, portions 66, 68 are respectively, pivotally, and slidably engaged within slots 138, 140. Enlarged or widened portions 74 reside within members 124, 126 and operatively retain portions 66, 68 within slots 138, 140.

The operation of assembly 120 is substantially identical to the operation of assembly 10. Particularly, assembly is selectively movable and securable between a "roof-mounted" position, in which rack 24 resides in relative close proximity to and substantially parallel to roof 14, and a "back end-mounted" position, in which rack 24 resides in relative remote proximity to roof 14 and substantially parallel to back end 16.

It should be understood that this invention is not limited to the exact construction or embodiments listed and described but that various changes may be made without departing from the spirit and scope of the invention.

What is claimed is:

1. A rack assembly for use with a vehicle of the type having a roof and a back end, said assembly comprising:

a first elongated rail having a first longitudinally extending slot, a first curved end portion which is fixedly mounted to said roof, and a first hook-shaped end portion;

a first generally trapezoidal shaped support member which is fixedly coupled to said first elongated rail and to said roof, and which operatively positions said first elongated rail at a predetermined distance above said roof;

a second elongated rail having a second longitudinally extending slot and a second curved end portion which is fixedly mounted to said roof, and a second hook-shaped end portion;

a second generally trapezoidal shaped support member which is fixedly coupled to said second elongated rail and to said roof, and which operatively positions said second elongated rail at a predetermined distance above said roof;

a rack member having a first portion and a second portion which are respectively and slidably engaged within said first and said second longitudinally extending slots, said slidable engagement allowing said rack member to be movable between a first position in which said rack member is disposed substantially parallel to said roof and in which said rack member resides within said first and said second hook-shaped end portions, and a second position in which said rack member is substantially parallel to said back end;

a plurality of fastening members which are coupled to said rack member and which selectively secure cargo to said rack member; and at least one fastener which is coupled to said back end and which is effective to selectively secure said rack member in said second position.

2. The rack assembly of claim 1 wherein said at least one fastener comprises a latch.

3. The rack assembly of claim 1 wherein said rack member includes first and a second elongated members and a plurality of extending members which laterally extend across said rack, each of said plurality of laterally extending members being fixedly coupled to each of said first and said second extending elongated members, thereby interconnecting said first and said second longitudinally elongated members.

4. The rack assembly of claim 3 wherein said first and said second elongated members are bowed.

5. The rack assembly of claim 1 further comprising a storage container which is removably disposed between said first and said second elongated rails.

6. The rack assembly of claim 1 further comprising a second fastener which is coupled to said first elongated rail and which is effective to selectively secure said rack member in said first position.

* * * * *